(12) United States Patent
Nishihara et al.

(10) Patent No.: US 9,425,897 B2
(45) Date of Patent: Aug. 23, 2016

(54) TRANSMISSION APPARATUS, TRANSMISSION SYSTEM, AND TRANSMISSION METHOD

(71) Applicant: FUJITSU LIMITED, Kawasaki-shi, Kanagawa (JP)

(72) Inventors: Masato Nishihara, Kawasaki (JP); Toshiki Tanaka, Setagaya (JP); Tomoo Takahara, Kawasaki (JP); Yutaka Kai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/507,058

(22) Filed: Oct. 6, 2014

(65) Prior Publication Data

US 2015/0104182 A1    Apr. 16, 2015

(30) Foreign Application Priority Data

Oct. 11, 2013   (JP) .................................. 2013-214216

(51) Int. Cl.
*H04B 10/2575* (2013.01)
*H04J 14/02* (2006.01)

(52) U.S. Cl.
CPC ...... *H04B 10/25752* (2013.01); *H04B 10/2575* (2013.01); *H04J 14/0298* (2013.01)

(58) Field of Classification Search
CPC .................... H04B 10/2575; H04B 10/25751; H04B 10/25752; H04B 10/25753; H04J 14/0298
USPC .................................................. 398/76, 115
See application file for complete search history.

(56) References Cited

U.S. PATENT DOCUMENTS

| 5,534,912 | A | 7/1996 | Kostreski |
| 2003/0007214 | A1* | 1/2003 | Aburakawa ...... H04B 10/25756 398/115 |
| 2005/0183131 | A1 | 8/2005 | Lee et al. |
| 2005/0188405 | A1 | 8/2005 | Lee et al. |
| 2009/0185806 | A1* | 7/2009 | Das .................... G02B 6/12011 398/68 |
| 2014/0248055 | A1* | 9/2014 | Freda ....................... H04K 1/10 398/76 |

FOREIGN PATENT DOCUMENTS

| CN | EP 2071752 A1 * | 6/2009 | ....... H04B 10/25754 |
| EP | 1 248 412 A2 | 10/2002 | |
| EP | 2 071 752 A1 | 6/2009 | |
| JP | 2004-112781 | 4/2004 | |
| WO | 2006/123904 A1 | 11/2006 | |

OTHER PUBLICATIONS

Extended European Search Report issued Feb. 20, 2015 in corresponding European Patent Application No. 14187909.8.

\* cited by examiner

*Primary Examiner* — Dalzid Singh
(74) *Attorney, Agent, or Firm* — Staas & Halsey LLP (57) ABSTRACT

A transmission apparatus includes: an assigning unit that assigns an information signal to a subcarrier with a frequency different from a frequency of a received radio signal; a creating unit that creates a multi-carrier signal, in which information signals are multiplexed, each of the information signals being assigned to one subcarrier by the assigning unit; and a multiplexing unit that frequency-multiplexes the received radio signal to the multi-carrier signal created by the creating unit and outputs a resulting frequency-multiplexed signal.

12 Claims, 8 Drawing Sheets

TRANSMISSION APPARATUS, TRANSMISSION SYSTEM, AND TRANSMISSION METHOD

CROSS-REFERENCE TO RELATED APPLICATION

This application is based upon and claims the benefit of priority of the prior Japanese Patent Application No. 2013-214216 filed on Oct. 11, 2013, the entire contents of which are incorporated herein by reference.

FIELD

The embodiments discussed herein are related to a transmission apparatus, a transmission system, and a transmission method.

BACKGROUND

Recently, communication traffics of radio signals in mobile terminal communication are tending to increase due to an increase in mobile terminals. In view of this, it is demanded to optically transmit radio signals in mobile terminal communication through an optical network that enables a large amount of data to be transmitted.

As for the optical network, a multi-carrier modulation system (such as, for example, a discrete multi-tone (DMT) modulation system) is used by which information signals are frequency-multiplexed to a plurality of subcarriers with different frequencies.

Japanese Laid-open Patent Publication No. 2004-112781 is an example of related art.

However, although it is demanded to optically transmit radio signals in mobile terminal communication through an optical network, it is difficult to efficiently transmit radio signals with a multi-carrier signal in which information signals are multiplexed.

SUMMARY

According to an aspect of the embodiments, a transmission apparatus includes: an assigning unit that assigns an information signal to a subcarrier with a frequency different from a frequency of a received radio signal; a creating unit that creates a multi-carrier signal, in which information signals are multiplexed, each of the information signals being assigned to one subcarrier by the assigning unit; and a multiplexing unit that frequency-multiplexes the received radio signal to the multi-carrier signal created by the creating unit and outputs a resulting frequency-multiplexed signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of a transmission apparatus, a transmission system, and a transmission method in the present disclosure will be described below in detail with reference to the drawings. The disclosed technology is not limited by these embodiments.

Figure 1:
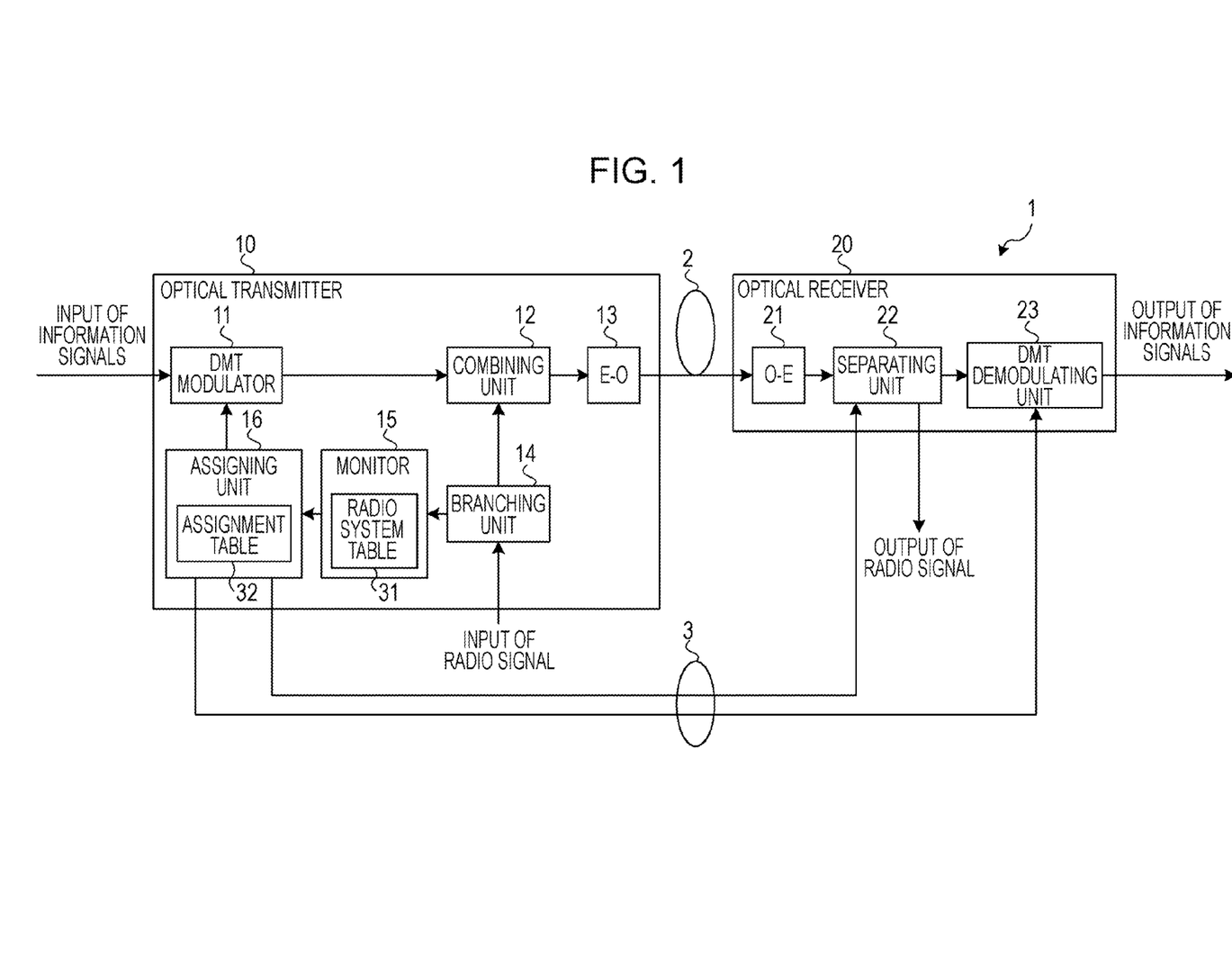
FIG. 1 is a block diagram illustrating an example of an optical transmission system in a first embodiment.

FIG. 1 is a block diagram illustrating an example of an optical transmission system in a first embodiment. The optical transmission system 1 in FIG. 1 includes an optical transmitter 10, an optical receiver 20, and an optical transmission path 2 that mutually connect the optical transmitter 10 and optical receiver 20. The optical transmitter 10 is, for example, a transmission apparatus such as an optical module connected to an optical access network connected to a base station that wirelessly accommodates mobile terminals. Examples of mobile terminals include mobile telephones, smart phones, tablet terminals, and other wireless terminals. The optical receiver 20 is, for example, a transmission apparatus such as an optical module accommodated in an optical metro network, an optical core network, or the like.

The optical transmitter 10 includes a DMT modulator 11, a combining unit 12, an electric-optical (E-O) converting unit 13, a branching unit 14, a monitor 15, and an assigning unit 16. The DMT modulator 11 modulates an information signal for each of subcarrier (SC) signal of channels with different particular frequencies and creates a multi-carrier signal, which is a type of DMT-modulated signal in which a plurality of information signals are multiplexed to carrier waves. The branching unit 14 receives a radio signal of a mobile terminal from, for example, a base station and transmits the received radio signal to the combining unit 12 and monitor 15. The combining unit 12 combines the radio signal to a DMT-modulated signal, which is a type of multi-carrier signal. The E-O converting unit 13 optically converts the multiplexed multi-carrier signal and outputs the resulting optical multi-carrier signal to the optical transmission path 2.

Figure 2:
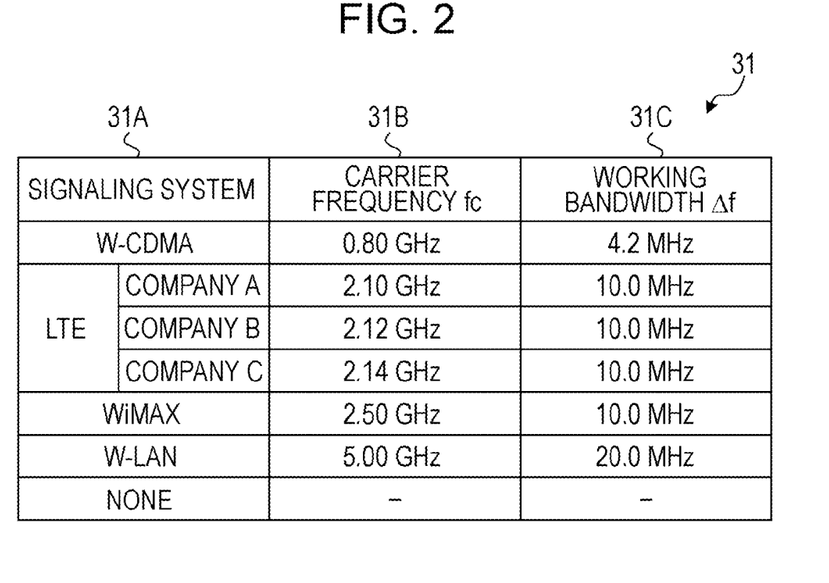
FIG. 2 illustrates an example of a radio system table.

The monitor 15 references a radio system table 31 and obtains the radio system of the radio signal received at the branching unit 14. FIG. 2 illustrates an example of the radio system table 31. In the radio system table 31 in FIG. 2, each signaling system 31A for radio signals is managed in correspondence to a carrier frequency 31B and a working bandwidth 31C. Examples of the signaling system 31A, which is a signaling system of a radio signal, include Wideband Code Division Multiple Access (W-CDMA), Long Term Evolution (trademark) (LTE), and WiMAX (trademark). Furthermore, even if signal systems are the same, they are separately managed for each of a plurality of communication carriers. The carrier frequency 31B is a carrier frequency used in its corresponding signal system. The working bandwidth 31C is a bandwidth used in its corresponding signal system. The monitor 15 analyzes the spectrum of the radio signal obtained from the branching unit 14 and obtains a peak frequency. The monitor 15 references the radio system table 31 and obtains the signaling system 31A, carrier frequency 31B, and working bandwidth 31C of the radio signal in correspondence to the peak frequency of the radio signal.

Figure 3:
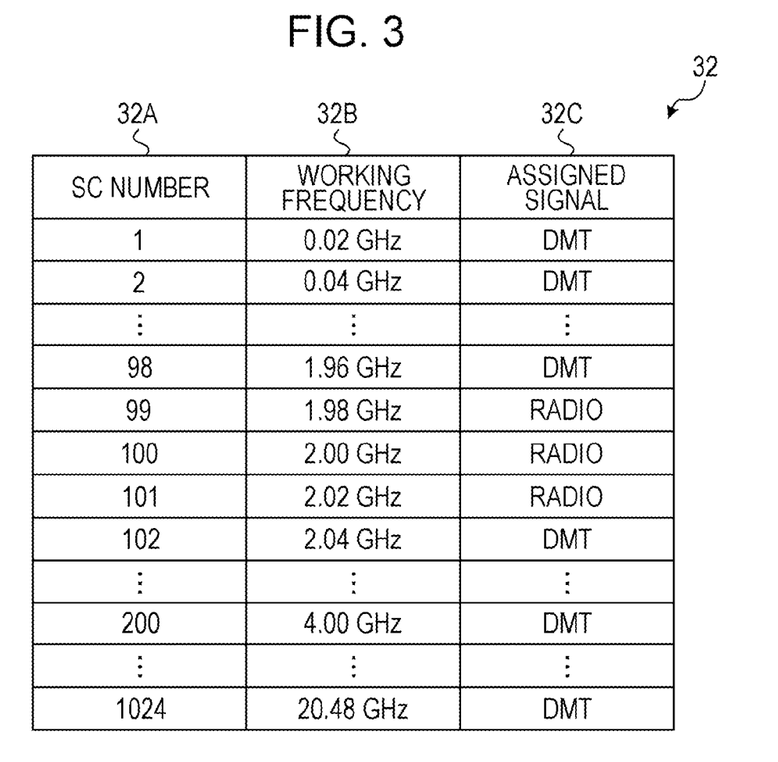
FIG. 3 illustrates an example of an assignment table.

The assigning unit 16 determines SCs to be assigned to the radio signal and information signals, according to the carrier frequency 31B and working bandwidth 31C, obtained from the monitor 15, which correspond to the signal system 31A of the radio signal. The assigning unit 16 has an assignment table 32. FIG. 3 illustrates an example of the assignment table 32. In the assignment table 32 in FIG. 3, a working frequency 32B and an assigned signal 32C are managed for each SC number 32A in correspondence to each other. The SC number 32A is an identification number that identifies an SC. The working frequency 32B is a frequency used by an SC for each SC number 32A. The assigned signal 32C is a signal type assigned to the SC identified by the SC number 32A; for example, the assigned signal 32C is "radio" indicating a radio signal or DMT indicating an information signal.

Figure 4:
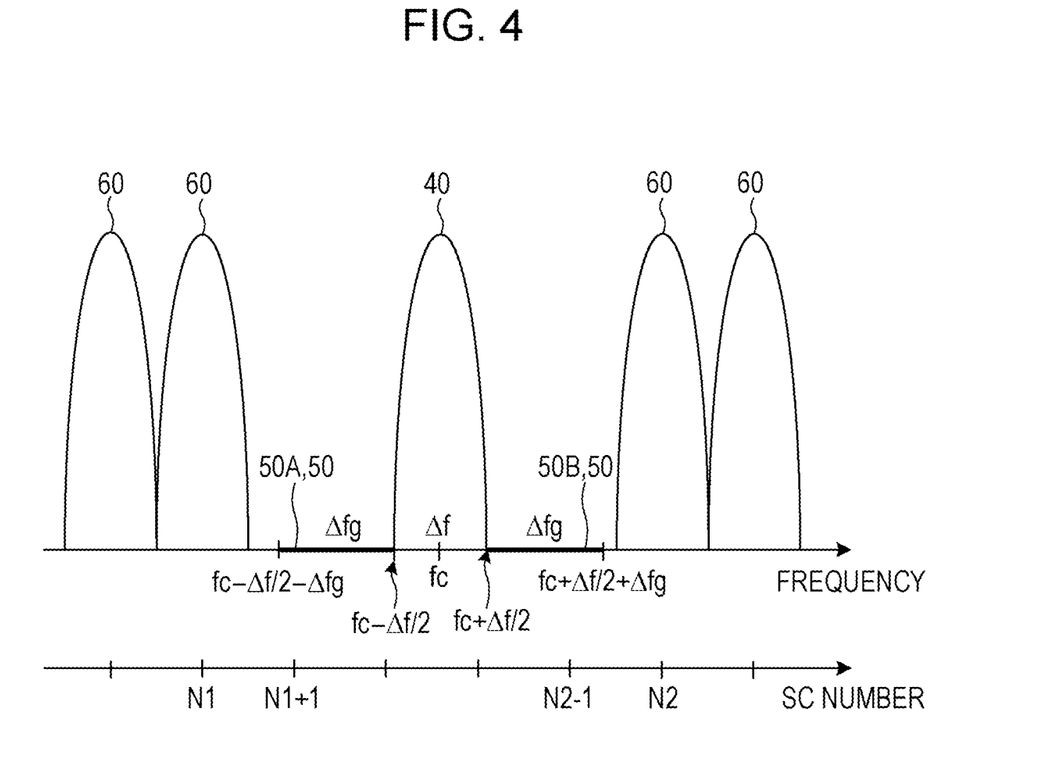
FIG. 4 illustrates an example of signals assigned in a multi-carrier signal in units of subcarriers.

FIG. 4 illustrates an example of signals assigned in a multi-carrier signal in SC units. The multi-carrier signal in FIG. 4 includes a radio signal 40, guard bands 50, and information signals 60. The assigning unit 16 obtains a carrier frequency fc and a working bandwidth $\Delta f$ corresponding to the signal system of the radio signal 40, the signal system being obtained from the monitor 15. The working bandwidth of the guard band 50 is denoted $\Delta fg$.

As illustrated in FIG. 4, the assigning unit 16 calculates a guard band 50A of the lower side of $fc-\Delta f/2-\Delta \Delta fg$ and a guard band 50B of the upper side of $fc+\Delta f/2+\Delta fg$, according to the frequency band of the radio signal 40 from $fc-\Delta f/2$ to $fc+\Delta f/2$.

The assigning unit 16 searches for a lower SC number N1 corresponding to a frequency band lower than $fc-\Delta f/2-\Delta fg$ and searches for SC numbers apart from the lower SC number N1 in the direction in which the frequency is lowered. The assigning unit 16 also searches for an upper SC number N2 corresponding to a frequency band higher than $fc+\Delta f/2+\Delta fg$ and searches for SC numbers apart from the upper SC number N2 in the direction in which the frequency is increased.

The assigning unit 16 assigns DMT, which indicates an information signal, to assigned signals 32C with SC numbers apart from the lower SC number N1 in the direction in which the frequency is lowered and to assigned signals 32C with SC numbers apart from the upper SC number N2 in the direction in which the frequency is increased. The assigning unit 16 also assigns "radio", which indicates a radio signal, to assigned signals 32C with SC numbers within the range from the SC number N1+1 of an SC next to an SC with the lower SC number N1 in the direction in which the frequency is increased to the SC number N2−1 of an SC next to an SC with the upper SC number N2 in the direction in which the frequency is lowered.

The assigning unit 16 updates the assigned signals 32C corresponding to the SC numbers 32A in the assignment table 32, according to the assignment results. The assigning unit 16 references the assignment table 32 and sets, in the DMT modulator 11, assignment information such as the working frequencies 32B and assigned signals 32C corresponding to the SC numbers 32A. The DMT modulator 11 creates a DMT-modulated signal by multiplying information signals to SCs with frequencies different from the frequency of the received radio signal according to the assignment information. Through, for example, a control line 3, the assigning unit 16 notifies the optical receiver 20 of setting information in which radio information, which includes the carrier frequency and working bandwidth of the radio signal, is added, besides the assignment information.

The optical receiver 20 includes an optical-electric (O-E) converting unit 21, a separating unit 22, and a DMT demodulating unit 23. The O-E converting unit 21 converts an optical multi-carrier signal received from the optical transmission path 2 to an electric signal to obtain a multi-carrier signal. The separating unit 22 separates the radio signal from the multi-carrier signal according to the carrier frequency fc and working bandwidth $\Delta f$ of the radio signal in the assignment information obtained from the optical transmitter 10, after which the separating unit 22 outputs the separated radio signal. The DMT demodulating unit 23 demodulates a DMT-modulated signal, which is a multi-carrier signal obtained after the radio signal has been separated, and outputs the resulting information signals.

Figure 5:
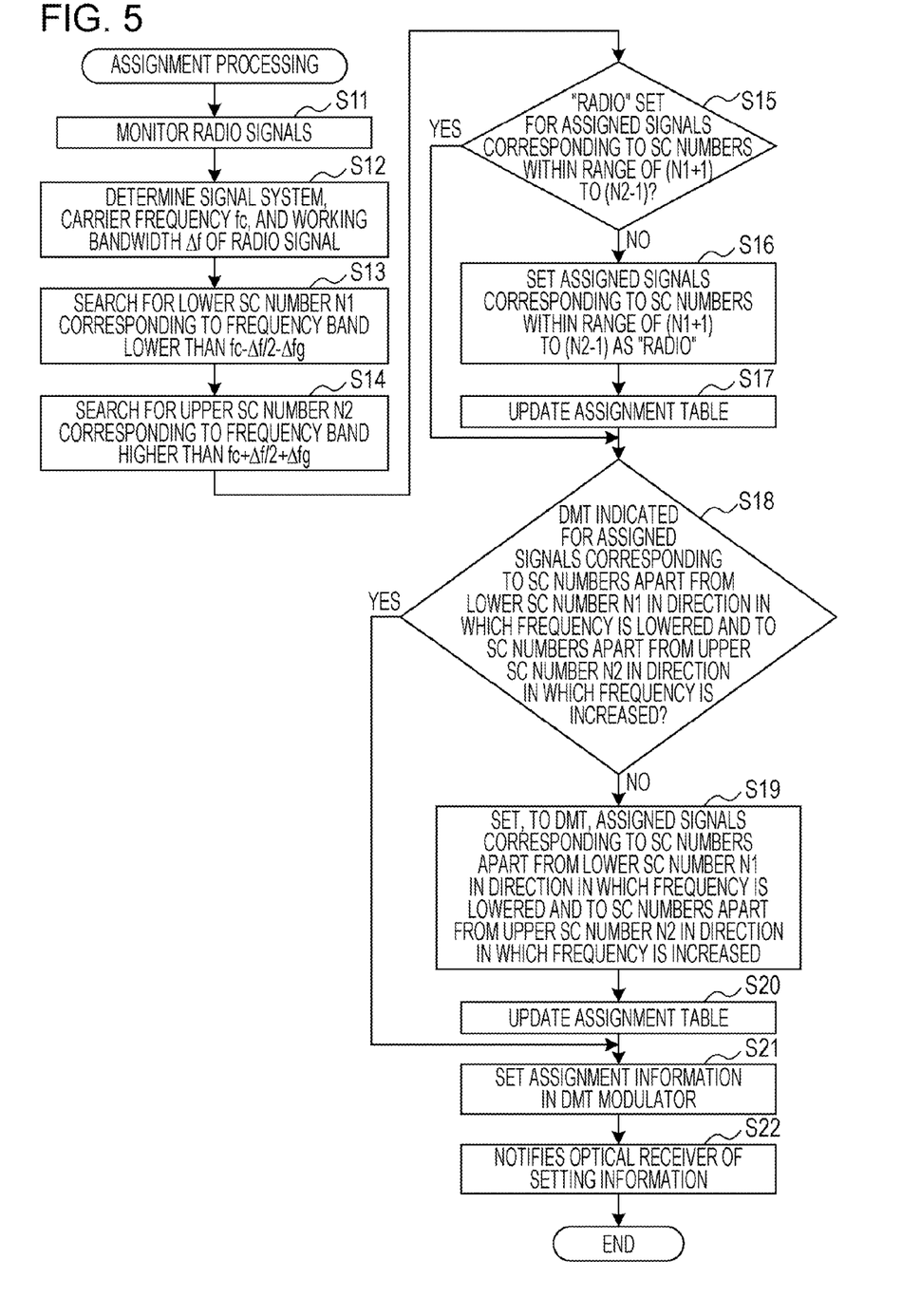
FIG. 5 is a flowchart illustrating an example of processing executed by an assigning unit, in an optical transmitter, that is involved in assignment processing.

Next, the optical transmission system 1 in the first embodiment will be described. FIG. 5 is a flowchart illustrating an example of processing executed by the assigning unit 16, in the optical transmitter 10, that is involved in assignment processing. In assignment processing in FIG. 5, SCs to be assigned to a radio signal and DMT-modulated signal are determined. In FIG. 5, the assigning unit 16 obtains, from the monitor 15, a monitor result including the peak frequency of a radio signal and the like (step S11). The assigning unit 16 references the radio system table 31 and determines the signal system, carrier frequency fc, and working bandwidth $\Delta f$ of the radio signal according to the monitor result (step S12). As illustrated in FIG. 4, the assigning unit 16 searches for the lower SC number N1 corresponding to a frequency band lower than $fc-\Delta f/2-\Delta fg$ according to the carrier frequency fc and working bandwidth $\Delta f$ (step S13). The assigning unit 16 then searches for the upper SC number N2 corresponding to a frequency band higher than $fc+\Delta f/2+\Delta fg$ (step S14).

The assigning unit 16 references the assignment table 32 and determines whether "radio" is set for an assigned signal 32C corresponding to an SC number 32A within a range of (N1+1) to (N2−1) (step S15). If the assigned signal 32C corresponding to the SC number 32A within the range of (N1+1) to (N2−1) is not "radio" (the result in step S15 is No), the assigning unit 16 sets the assigned signal 32C corresponding to the SC number 32A within the range of (N1+1) to (N2−1) as "radio" (step S16). The assigning unit 16 then updates the assignment table 32 (step S17).

The assigning unit 16 references the assignment table 32 and determines whether DMT is indicated for the assigned signals 32C corresponding to SC numbers apart from the lower SC number N1 in the direction in which the frequency is lowered and to SC numbers apart from the upper SC number N2 in the direction in which the frequency is increased (step S18). If DMT is not indicated for these assigned signals 32C (the result in step S18 is No), the assigning unit 16 sets the assigned signals 32C corresponding to these SC numbers to DMT (step S19). The assigning unit 16 then updates the assignment table 32 (step S20).

If the assigning unit 16 sets assignment information, which is an update of the assignment table 32, in the DMT modulator 11 (step S21). The assigning unit 16 then notifies the optical receiver 20 of setting information, which includes assignment information and radio information (step S22), terminating the processing in FIG. 5. As a result, the optical receiver 20 sets the setting information in the separating unit 22 and DMT demodulating unit 23. The separating unit 22 separates the radio signal from the multi-carrier signal according to the carrier frequency and working bandwidth of the radio signal in the assignment information, after which the separating unit 22 outputs the separated radio signal. The DMT demodulating unit 23 demodulates a DMT-modulates signal, which is a multi-carrier signal obtained after the radio signal has been separated, and outputs the resulting information signals.

If the assigned signal 32C corresponding to the SC number 32A within the range of (N1+1) to (N2−1) is "radio" (the result in step S15 is Yes), the assigning unit 16 proceeds to step S18. If DMT is indicated for these assigned signals 32C (the result in step S18 is Yes), the assigning unit 16 proceeds to step S21, where the assigning unit 16 sets the assignment information in the DMT modulator 11.

The assigning unit 16 involved in assignment processing in FIG. 5 assigns the received radio signal to an SC intended for a frequency of a radio signal according to the signal system, carrier frequency, and working bandwidth of the received radio signal, and assigns DMT signals to SCs with frequencies different the frequency of the received radio signal. The assigning unit 16 updates the assignment table 32 with the assignment information. As a result, the optical transmitter 10 can efficiently multiplex a radio signal to a DMT-modulated signal, in which information signals have been multiplexed for each SC so that the frequency of the radio signal do not match the frequency of any information signal, according to the assignment information.

The assigning unit 16 notifies the optical receiver 20 of the setting information, which includes assignment information and radio information. The separating unit 22 in the optical receiver 20 separates the radio signal from the multi-carrier signal according to the radio information in the setting information, after which the separating unit 22 outputs the separated radio signal. The DMT demodulating unit 23 demodulates a DMT-modulated signal obtained after the radio signal has been separated, and outputs the resulting information signals.

Figure 6:
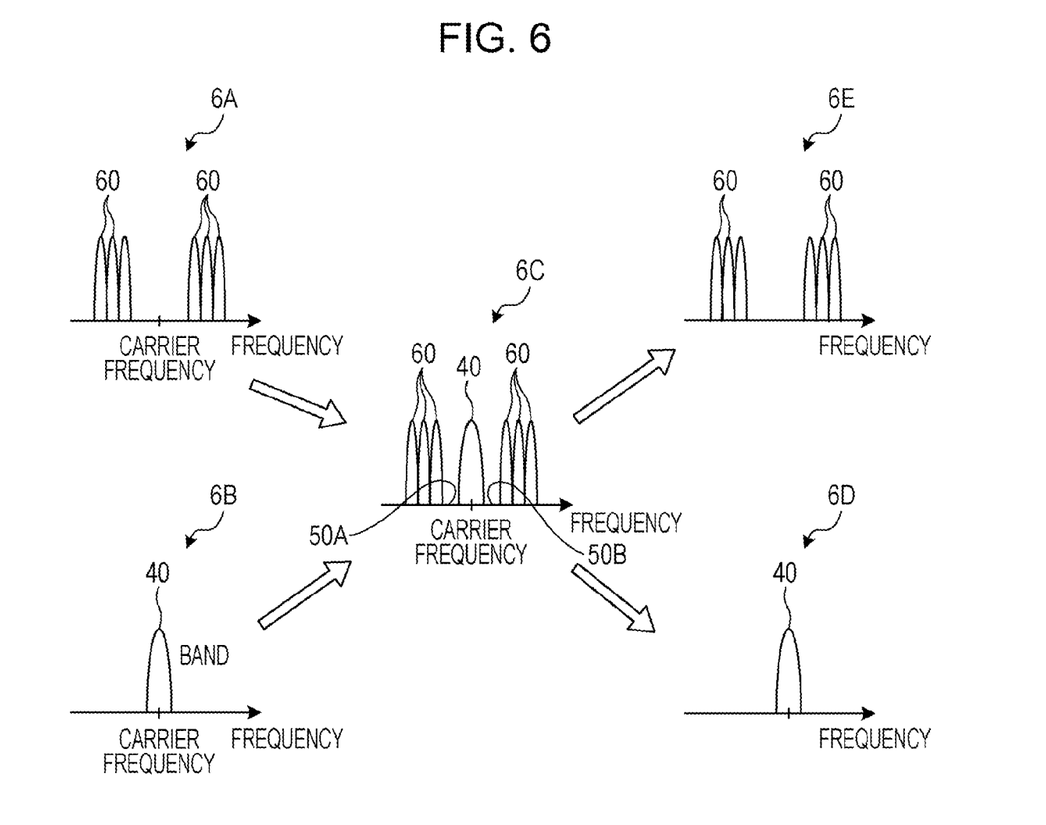
FIG. 6 illustrates an example of an operation in multiplexing and demultiplexing performed on a multi-carrier signal.

FIG. 6 illustrates an example of an operation in multiplexing and demultiplexing performed on a multi-carrier signal by the optical transmitter 10 and optical receiver 20. As illustrated in 6A in FIG. 6, the DMT modulator 11 in the optical transmitter 10 creates a multi-carrier signal, which is a DMT-modulated signal, in which information signals 60 are multiplexed to SCs with frequencies different from the frequency of a radio signal 40 in 6B in FIG. 6, according to the assignment information. The combining unit 12 in the optical transmitter 10 combines the radio signal 40 in 6B in FIG. 6 to the multi-carrier signal, which is a DMT-modulated signal, in 6A in FIG. 6 to create a multi-carrier signal illustrated in 6C in FIG. 6. The multi-carrier signal in 6C in FIG. 6 includes an upper guard band 50A between one information signal 60 and the radio signal 40 and a lower guard band 50B between another information signal 60 and the radio signal 40. The optical transmitter 10 transmits the multi-carrier signal to the optical receiver 20 through the optical transmission path 2. The separating unit 22 in the optical receiver 20 outputs the radio signal 40 in 6D in FIG. 6 from the multi-carrier signal according to the radio information in the setting information. The separating unit 22 also obtains a DMT-modulated signal illustrated in 6E in FIG. 6, which is a multi-carrier signal obtained after the radio signal 40 has been separated. The DMT demodulating unit 23 in the optical receiver 20 demodulates the DMT-modulated signal and outputs the information signals 60. As a result, the optical receiver 20 obtains not only information signals 60 but also the radio signal 40 from the multi-carrier signal transmitted from the optical transmitter 10.

The optical transmitter 10 in the first embodiment assigns information signals to SCs with frequencies different from the frequency of a received radio signal and creates a DMT-modulated signal in which information signals assigned to individual SCs are multiplexed. The optical transmitter 10 frequency-multiplexes the radio signals to the multi-carrier signal and transmits the resulting frequency-multiplexed signal. As a result, the optical transmitter 10 can efficiently transmit a radio signal by using a multi-carrier signal, which is a DMT-modulated signal in which information signals are multiplexed.

The optical transmitter 10 assigns information signals to SCs in a DMT-modulated signal so that the guard bands 50A and 50B, each of which is a non-used frequency band, are each inserted between an information signal and the radio signal in the DMT-modulated signal. As a result, the optical transmitter 10 can suppress signal interference between a radio signal and an information signal by inserting the guard bands 50A and 50B.

The optical transmitter 10 determines radio information according to the peak frequency of the spectrum of a radio signal. As a result, the optical transmitter 10 can automatically recognizes radio information about a received radio signal and can assign SCs according to the type of radio system.

The optical transmitter 10 notifies the optical receiver 20 of setting information, which includes frequency information about a radio signal and assignment information about information signals. As a result, the optical receiver 20 can extract the radio signal and information signals from the multi-carrier signal according to the setting information.

To notify the optical receiver 20 of setting information, the optical transmission system 1 in the first embodiment has used the control line 3 rather than optical transmission path 2 to transmit the setting information from the optical transmitter 10. However, the optical transmission system 1 may include the setting information in a control signal in a multi-carrier signal to be transmitted through the optical transmission path 2 and may transmit the multi-carrier signal from the optical transmitter 10 to the optical receiver 20. This transmission will be described below as a second embodiment.

Figure 7:
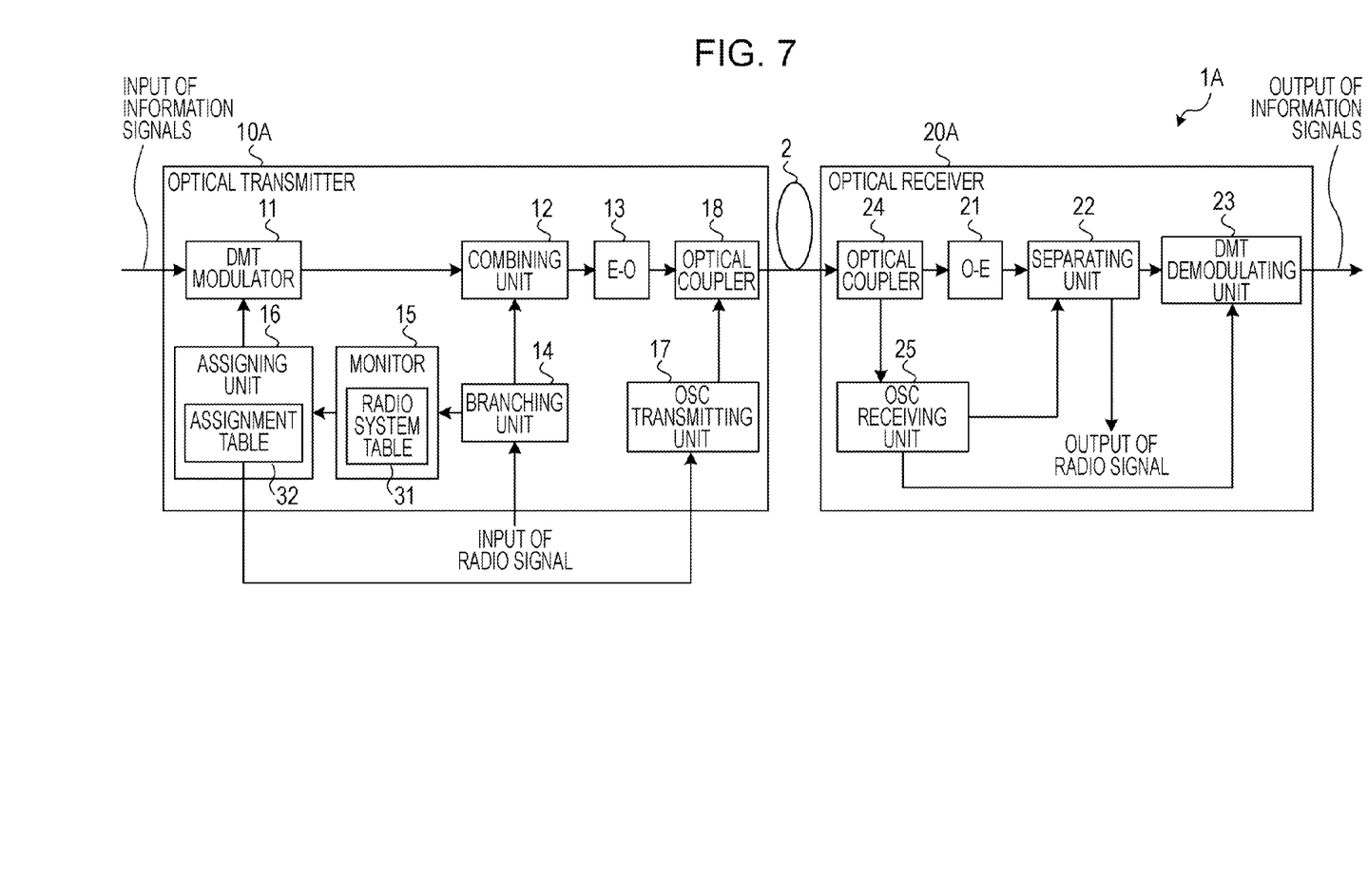
FIG. 7 is a block diagram illustrating an example of an optical transmission system in a second embodiment.

FIG. 7 is a block diagram illustrating an example of an optical transmission system in a second embodiment. The same elements as in the optical transmission system 1 in FIG. 1 are assigned the same reference numerals and repeated descriptions of the structure and operation will be omitted. The optical transmission system 1A in FIG. 7 differs from the optical transmission system 1 in FIG. 1 in that setting information is included in an optical service channel (OSC) signal used as a control channel of an optical multi-carrier signal and the optical multi-carrier signal is transmitted from an optical transmitter 10A to an optical receiver 20A.

The optical transmitter 10A includes an OSC transmitting unit 17 that stores setting information in the OSC signal in an optical multi-carrier signal, and also includes an optical coupler 18 that combines the OSC signal and optical multi-carrier signal together. The optical receiver 20A includes an optical coupler 24 that optically branches the optical multi-carrier signal received through the optical transmission path 2, and also includes an OSC receiving unit 25 that receives the OSC signal from the optically branched optical multi-carrier signal. The OSC receiving unit 25 sets, in the separating unit 22, the radio information in the setting information included in the OSC signal. As a result, the separating unit 22 can separate the radio signal and DMT-modulated signal from the optical multi-carrier signal according to the carrier frequency and working bandwidth, included in the radio information, of the radio signal, and can output these separated signals. The OSC receiving unit 25 also sets, in the DMT demodulating unit 23, the assignment information in the setting information included in the OSC signal. As a result, the DMT demodulating unit 23 can demodulate the DMT-modulated signal and can output information signals.

The optical transmission system 1A in the second embodiment sets setting information in the OSC signal in an optical multi-carrier signal and transmits the optical multi-carrier signal from the optical transmitter 10A to the optical receiver 20A. As a result, the optical transmitter 10A can transmit setting information to the optical receiver 20A in real time by using an optical multi-carrier signal without using the control line 3.

The optical transmission system 1 in the first embodiment has optically converted a multi-carrier signal, which is a DMT-modulated signal, to which a radio signal is electrically combined. However, the DMT-modulated signal and radio signal may be optically converted separately, after which the DMT-modulated signal and radio signal may be optically frequency-multiplexed together. This multiplexing will be described below as a third embodiment.

Figure 8:
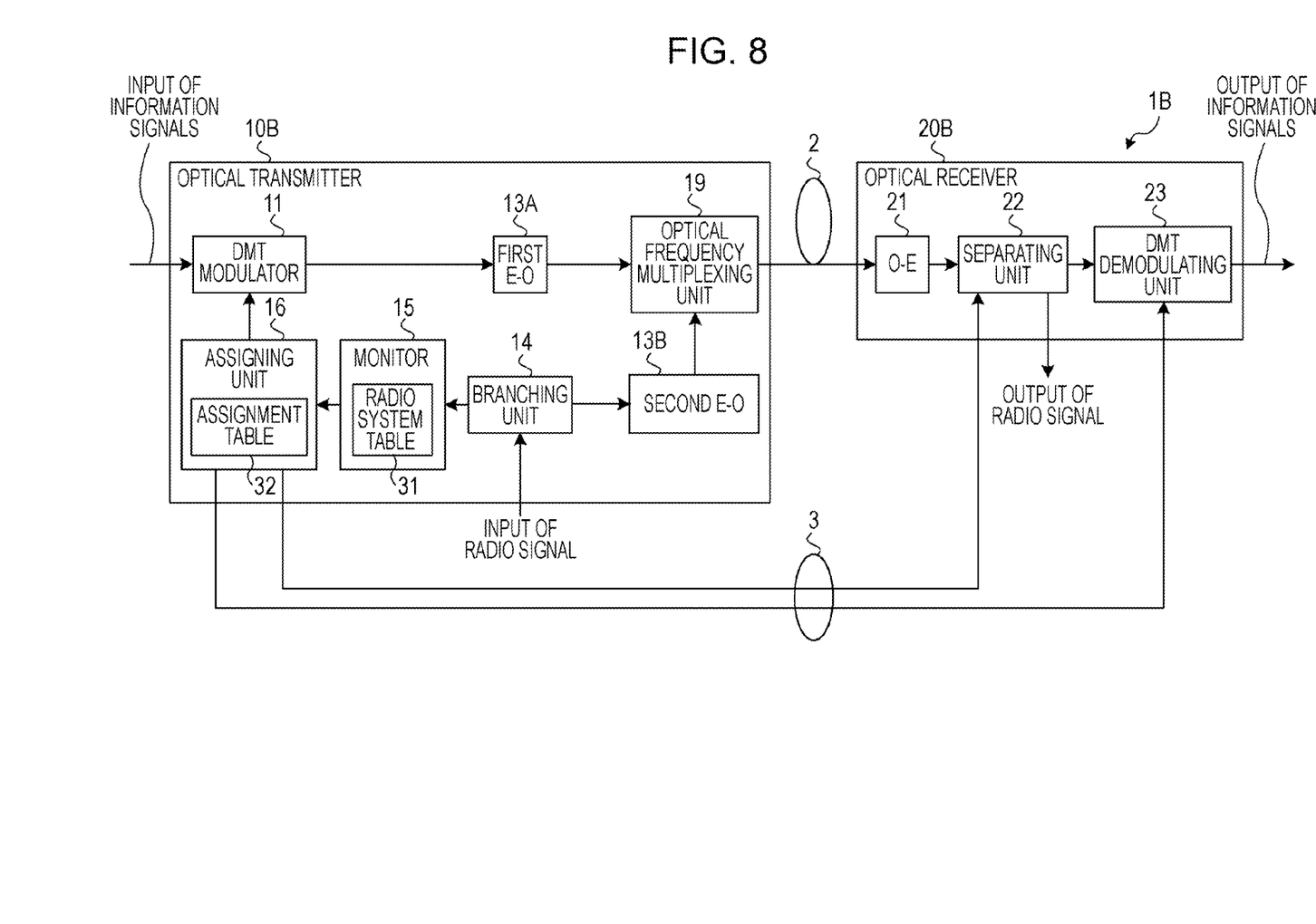
FIG. 8 is a block diagram illustrating an example of an optical transmission system in a third embodiment.

FIG. 8 is a block diagram illustrating an example of an optical transmission system in a third embodiment. The same elements as in the optical transmission system 1 in FIG. 1 are assigned the same reference numerals and repeated descriptions of the structure and operation will be omitted. The optical transmission system 1B in FIG. 8 differs from the optical transmission system 1 in FIG. 1 in that a DMT-modulated signal and a radio signal are optically converted separately, after which the DMT-modulated signal and radios signal are optically frequency-multiplexed together.

The optical transmitter 10B in FIG. 8 includes a first E-O converting unit 13A, a second E-O converting unit 13B, and an optical frequency multiplexing unit 19. The first E-O converting unit 13A optically converts a multi-carrier signal, which is a DMT-modulated signal, received from the DMT modulator 11. The second E-O converting unit 13B optically converts a radio signal received from the branching unit 14. The optical frequency multiplexing unit 19 optically frequency-multiplexes the optically converted DMT-modulated signal and optically converted radio signal together and outputs the resulting optical multi-carrier signal.

The optical transmitter 10B optically converts, in the DMT modulator 11, a multi-carrier signal, which is a DMT-modulated signal, in which information signals are multiplexed to SCs with frequencies different from the frequency of the received radio signal, and also optically converts the received radio signal. The optical frequency multiplexing unit 19 in the optical transmitter 10B optically frequency-multiplexes the optically converted radio signal to the optically converted multi-carrier signal and outputs the resulting optical multi-carrier signal to the optical transmission path 2.

Since the optical transmission system 1B in the third embodiment optically frequency-multiplexes an optically converted radio signal to an optical multi-carrier signal, which is an optically converted DMT-modulated signal, the optical transmission system 1B is advantageous in signal processing in a high-frequency band when compared with a case in which electric signals are used in frequency multiplexing.

Although the optical transmitters 10, 10A, and 10B in a DMT modulation system has been exemplified in the first to third embodiments described above, these embodiments can also be applied to optical transmitters in other multi-carrier modulation systems in which information signals are multiplexed to a plurality of SCs. For example, these embodiments can be applied to optical transmitters in orthogonal frequency division multiplexing (OFDM) modulation systems, phase shift keying (PSK) modulation systems including a quadrature phase shift keying (QPSK) modulation system, and other multi-carrier modulation systems. Similarly, these embodiments can also be applied to optical transmitters in differential phase shift keying (DPSK) modulation systems, 8PSK modulation systems, and the like.

Although the optical transmitter 10 and optical receiver 20 in the first embodiment has have been separately illustrated, they may be built into a single optical module. This is also true for the optical transmitter 10A and optical receiver 20A in the second embodiment and for the optical transmitter 10B and optical receiver 20B in the third embodiment.

The physical layouts of the constituent elements of individual units illustrated in the relevant drawings may not be limited to the layouts illustrated in the drawings. That is, specific forms of distribution and integration of constituent elements are not limited to the forms illustrated in the drawings. All or part of the constituent elements may be functionally or physically distributed or integrated in a desired unit, depending on the loads and usage status.

All or any part of processing functions executed in individual units may be executed by a central processing unit (CPU) (or a microcomputer such as a microprocessing unit (MPU) or a microcontroller unit (MCU)). It will be appreciated that all or any part of these processing functions can be executed by programs interpreted and executed by a CPU (or a microcomputer such as an MPU or an MCU) or by wired-logic hardware.

Figure 9:
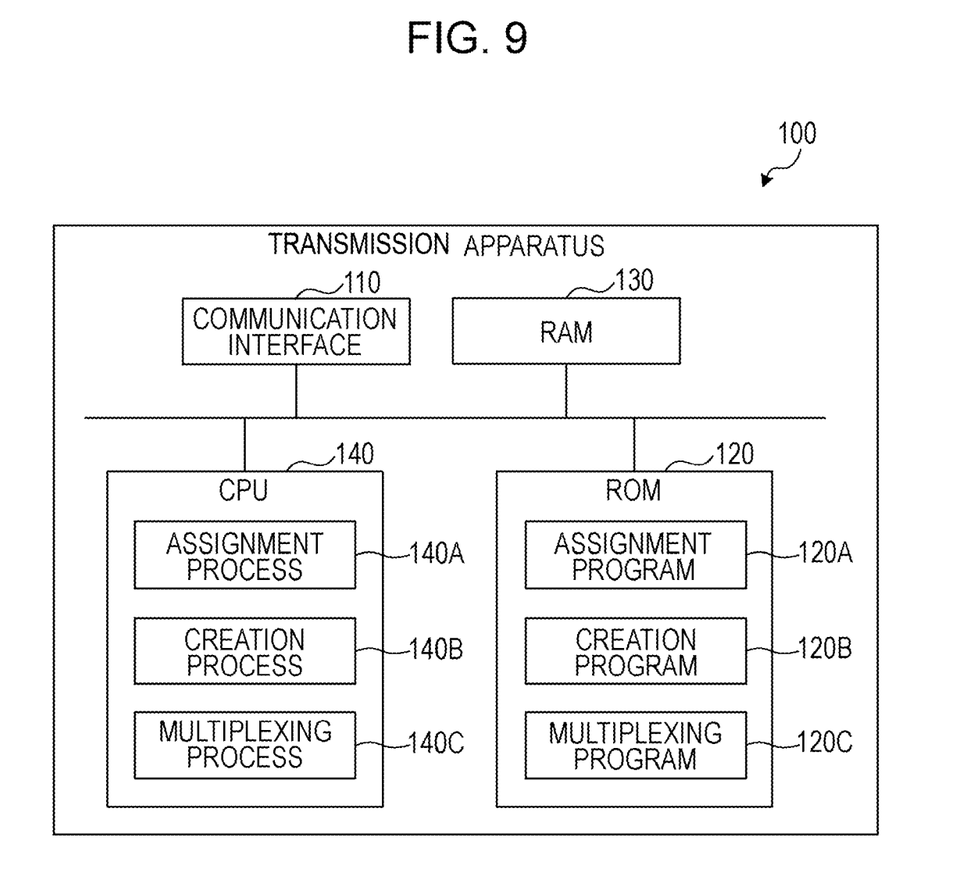
FIG. 9 illustrates a transmission apparatus that executes transmission programs.

The various processing described in the above embodiments can be implemented by an optical module that executes prestored programs. An example of a transmission apparatus, such as an optical module, that executes programs having functions as in the embodiments described above will be described below. FIG. 9 illustrates a transmission apparatus 100 that executes transmission programs.

In FIG. 9, the transmission apparatus 100, which executes transmission programs, includes a communication interface 110, a read-only memory (ROM) 120, a random-access memory (RAM) 130, and a processor 140.

Transmission programs that provide functions as in the embodiments described above are prestored in the ROM 120. The transmission programs may have been recorded on a recording medium that can be read by a drive unit (not illustrated) instead of the ROM 120. The recording medium may be, for example, a compact disc-read-only memory (CD-ROM), a digital versatile disc (DVD), a Universal Serial Bus (USB) memory, a secure digital (SD) card, or another portable recording medium. Alternatively, the recording medium may be a flash memory or another semiconductor memory. The transmission programs may be obtained from a storage unit with which communication is possible through a network. The transmission programs include an assignment program 120A, a creation program 120B, and a multiplexing program 120C as illustrated in FIG. 9. The assignment program 120A, creation program 120B, and multiplexing program 120C can be appropriately combined and separated.

The processor 140 reads out the assignment program 120A, creation program 120B, and multiplexing program 120C from the ROM 120 and executes the read-out assignment program 120A, creation program 120B, and multiplexing program 120C. The processor 140 causes the assignment program 120A, creation program 120B, and multiplexing program 120C to respectively function as an assignment process 140A, a creation process 140B, and a multiplexing process 140C.

The processor 140 performs processing to assign information signals to subcarriers with frequencies different from the frequency of a received radio signal. The processor 140 performs processing to create a multi-carrier signal in which the information signals assigned to the subcarriers are multiplexed. The processor 140 performs processing to frequency-multiplex the radio signal to the created multi-carrier signal and outputs the resulting frequency-multiplexed signal. As a result, the transmission apparatus 100 can efficiently transmit a radio signal by using a multi-carrier signal in which information signals are multiplexed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus, comprising:
    an assigning unit that assigns an information signal to a subcarrier with a frequency different from a frequency of a received radio signal and assigns the received radio signal to a subcarrier with a frequency different from the frequency of the received radio signal;
    a creating unit that creates a multi-carrier signal, in which information signals are multiplexed, each of the information signals being assigned to one subcarrier by the assigning unit; and
    a multiplexing unit that frequency-multiplexes the received radio signal to the multi-carrier signal created by the creating unit and outputs a resulting frequency-multiplexed signal.

2. The transmission apparatus according to claim 1, wherein the assigning unit assigns the information signal to the subcarrier so that a non-used frequency band is provided between the frequency of the received radio signal and a frequency of a subcarrier assigned to an information signal next to the received radio signal.

3. The transmission apparatus according to claim 1, wherein the multiplexing unit has
    a first converting unit that converts the multi-carrier signal, in which the information signals are multiplexed, to a first optical signal,
    a second converting unit that converts the received radio signal to a second optical signal, and
    an optical multiplexing unit that optically frequency-multiplexes the second optical signal to the first optical signal and outputs a resulting optically multiplexed signal.

4. The transmission apparatus according to claim 1, wherein the multiplexing unit multiplexes the information signals to subcarriers in a discrete multi-tone modulation system.

5. A transmission apparatus, comprising:
    an assigning unit that assigns an information signal to a subcarrier with a frequency different from a frequency of a received radio signal;
    a creating unit that creates a multi-carrier signal, in which information signals are multiplexed, each of the information signals being assigned to one subcarrier by the assigning unit;
    a multiplexing unit that frequency-multiplexes the received radio signal to the multi-carrier signal created by the creating unit and outputs a resulting frequency-multiplexed signal; and a notifying unit that notifies a distant apparatus of setting information that includes frequency information about the frequency of the received radio signal and assignment information about each subcarrier assigned to one of the information signals, the distant apparatus being configured to receive the multi-carrier signal.

6. A transmission system, comprising:
    a transmitting unit; and
    a receiving unit that receives a multi-carrier signal from the transmitting unit; wherein
    the transmitting unit includes
        an assigning unit that assigns an information signal to a subcarrier with a frequency different from a frequency of a received radio signal,
        a creating unit that creates a multi-carrier signal, in which information signals are multiplexed, each of the information signals being assigned to one subcarrier by the assigning unit,
        a multiplexing unit that frequency-multiplexes the received radio signal to the multi-carrier signal created by the creating unit and outputs a resulting frequency-multiplexed signal, and
        a notifying unit that notifies the receiving unit of setting information that includes frequency information about the frequency of the received radio signal and assignment information about each subcarrier assigned to one of the information signals, and
    the receiving unit includes a separating unit separates the multi-carrier signal into the received radio signal and the information signals according to the setting information from the transmitting unit.

7. A transmission method, wherein a processor of a transmitting unit executes processing to
    assign an information signal to a subcarrier with a frequency different from a frequency of a received radio signal,
    assign the received radio signal to a subcarrier with a frequency different from the frequency of the received radio signal,
    create a multi-carrier signal, in which information signals are multiplexed, each of the information signals being assigned to one subcarrier, and
    frequency-multiplex the received radio signal to the created multi-carrier signal and outputs a resulting frequency-multiplexed signal.

8. A transmission apparatus, comprising:
    an assigning unit that assigns an information signal to a subcarrier with a frequency different from a frequency of a received radio signal and assigns the received radio signal to a subcarrier with a frequency different from the frequency of the received radio signal;
    a creating unit that creates a multi-carrier signal, in which information signals are multiplexed, each of the information signals being assigned to one subcarrier by the assigning unit;
    a multiplexing unit that frequency-multiplexes the received radio signal to the multi-carrier signal created by the creating unit and outputs a resulting frequency-multiplexed signal; and
    an obtaining unit that obtains the frequency of the received radio signal.

9. The transmission apparatus according to claim 8, wherein the assigning unit assigns the information signal to the subcarrier so that a non-used frequency band is provided between the frequency of the received radio signal and a frequency of a subcarrier assigned to an information signal next to the received radio signal.

10. The transmission apparatus according to claim 8, further comprising a notifying unit that notifies a distant apparatus of setting information that includes frequency information about the frequency of the received radio signal and assignment information about each subcarrier assigned to one of the information signals, the distant apparatus being configured to receive the multi-carrier signal.

11. The transmission apparatus according to claim 8, wherein the multiplexing unit has
- a first converting unit that converts the multi-carrier signal, in which the information signals are multiplexed, to a first optical signal,
- a second converting unit that converts the received radio signal to a second optical signal, and
- an optical multiplexing unit that optically frequency-multiplexes the second optical signal to the first optical signal and outputs a resulting optically multiplexed signal.

12. The transmission apparatus according to claim 8, wherein the multiplexing unit multiplexes the information signals to subcarriers in a discrete multi-tone modulation system.

\* \* \* \* \*